United States Patent [19]
Dupré

[11] 3,823,674
[45] July 16, 1974

[54] BIN TYPE FREIGHT CAR

[75] Inventor: Barry E. Dupré, Lansing, Ill.

[73] Assignee: North American Car Corporation, Chicago, Ill.

[22] Filed: Dec. 20, 1971

[21] Appl. No.: 209,579

[52] U.S. Cl............. 105/366 R, 105/360, 105/367
[51] Int. Cl............................ B60p 1/64, B65j 1/02
[58] Field of Search............... 105/366 R, 367, 360; 280/5 A; 220/63; 150/.5, 1; 206/46 L

[56] References Cited
UNITED STATES PATENTS

| 500,773 | 7/1893 | Perelli-Minetti | 105/367 |
|---|---|---|---|
| 2,020,628 | 11/1935 | Woodruff | 105/366 R |
| 2,083,479 | 6/1937 | Speare | 206/46 L |
| 2,377,989 | 6/1945 | Braun | 105/367 |
| 2,394,607 | 2/1946 | Gray et al. | 105/367 |
| 2,758,747 | 8/1956 | Stevens | 105/367 |
| 2,913,029 | 11/1959 | Paton | 105/367 |
| 3,095,206 | 6/1963 | Fresia et al. | 105/367 |

Primary Examiner—Drayton E. Hoffman
Attorney, Agent, or Firm—Molinare, Allegretti, Newitt & Witcoff

[57] ABSTRACT

A vehicle having a flat deck provided with a plurality of upwardly open bins or cells, with each bin or cell dimensioned for receiving, supporting and transporting an individual self-contained, flexible, collapsible container filled with flowable material.

13 Claims, 5 Drawing Figures

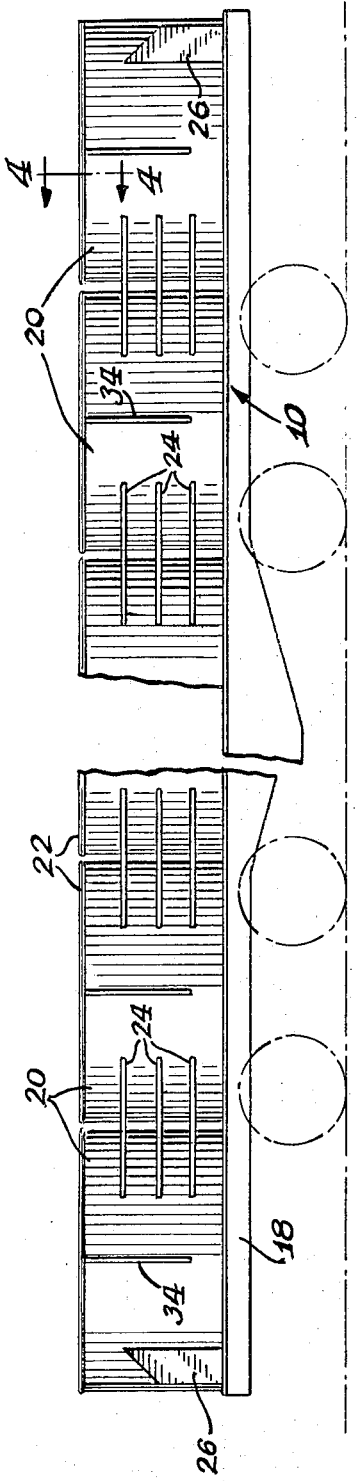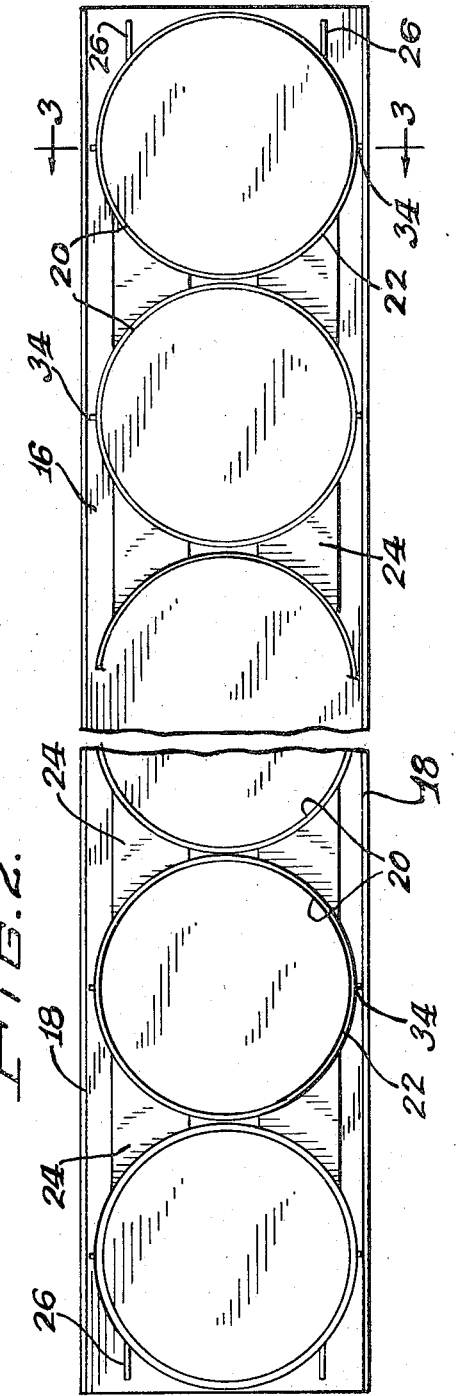

BIN TYPE FREIGHT CAR

BACKGROUND OF THE INVENTION

This invention relates to a vehicle construction for transporting substantial distances by rail or over highways, a plurality of individual, self-contained flexible, collapsible containers filled with flowable material.

Containers of this type referred to have been extensively used for many years for handling, storing and transporting of a wide variety of flowable materials in the nature of liquid cargoes or dry cargoes. Liquid cargoes capable of such handling may, for example, be petroleum products, vegetable oils, alcohols, liquid sugars, liquid fertilizers, various liquid chemicals and others. Dry cargoes capable of being handled by such containers include bulk materials that can be blown or flowed into the containers, such as pulverulent, granular or particulate materials. Such bulk materials that may be so handled are of various types and natures, such as dehydrated foods, food ingredients, chemicals, carbon black and numerous others. Such containers for handling dry bulk materials may be gravity or pressure loaded through a port at the top of the container and are unloaded by gravity or suction through a discharge port at the bottom of the container. These containers, known in the trade as Sealdbins, are made of rubber and sometimes are provided with suitable reinforcing structures, depending upon the nature and weight of the material to be contained therein. Such containers, when filled with material, generally assume a substantially cylindrical form in cross section and have a relatively flat bottom and a flattened dome-shaped top when the container is supported on its bottom.

The containers are formed of rubber or other suitable flexible material and are capable of being substantially collapsed when empty. Such collapsed containers occupy approximately 15 percent of the volume attained when they are filled. Because of this fact, there results a substantial advantage to the shippers when the empty containers are returned to the source of origin. The use of such containers, in addition to serving as a convenient means of transporting material, also may be used as outside storage for the materials contained therein, thus effecting great economy in savings of time and providing convenience in the handling of material either for storage or incident to the use of such material in a plant or factory.

Sealdbin containers are made up in various sizes or capacities and the present invention is especially directed to containers of the larger type intended for shipment of material by railroad cars or by trucks or trailers. One of the larger size containers of this type is capable of receiving approximately 300 cubic feet of material. These containers are provided centrally at their upper end thereof with a large eye-type fitting for the reception of a single tine of a fork lift truck for moving filled containers from place to place, such as in placement in storage or in movement interiorly of a building where the material is to be used as well as for loading filled containers on or removing them from a vehicle. When a filled container is lifted and suspended, due to the flexible material of the body thereof, the outside diameter is reduced several inches due to the elongation of the body incident to the filled container being suspended.

Heretofore, in shipping a number of filled containers of the larger capacity, as above referred to, over substantial distances, use has been made of an upwardly open gondola-type railroad car, having the ends thereof and an intermediate portion modified by added structures which are shaped to provide a contour somewhat conforming to a portion of the outer contour of the filled container and such added structures are in the nature of bulk head types for absorbing impact loads. Such a modified car results in several disadvantages as well as relatively high costs incident to modification for such use. In utilizing such a modified car, a substantial number of filled containers are placed therein in close, side-by-side relation and impact forces or loads are directly transmitted from one container to the next and finally the extremely high impact load is transmitted to the bulk head type structures. In order to withstand such high impact loads, the bulk head type structures must be of the heavy-duty type, including substantial reinforcing structures. Another disadvantage flowing from the use of modified gondola-type railroad car rises by reason of the substantial size voids that are formed at each side of the car, between two adjacent containers, in which moisture in the form of rain or snow may be deposited. If under such conditions the loaded car is subjected to relatively low temperatures, the containers frequently become frozen to the interior surfaces of the car, making it extremely difficult and sometimes impossible to remove the filled containers from the car by the usual methods of employing a single tine fork lift truck. When this condition occurs, it results in substantial delay in handling of materials for immediate storage or use as well as substantial increases in costs incident to such delays in handling. Generally, gondola-type railroad cars are produced in rather short lengths as compared to many other types of cars and because of this fact, the short length of such a car permits accommodating only about seven or eight of the large capacity flexible containers, as above referred to, if properly loaded. Other modified types of gondola-type railroad cars have been produced in greater lengths which permit accommodating a maximum of 10 of the large capacity, flexible containers, if properly loaded. Moreover, because of the short length of such cars, the shipper is compelled to pay substantially greater tariff rates as compared to the tariff rates incident to the use of longer railroad cars, such as a flat deck railroad car of 85 feet length and embodying the present invention which would be capable at all times, of accommodating 11 of the larger size containers and which permits attaining the advantage of maximum lading weight and lower tariff rates.

The present invention contemplates the use of a flat deck type vehicle such as a railroad car, truck or trailer, and if the deck is made of wood, it need be modified only to the extent of resurfacing the deck with steel plate. To apply the present invention to a steel flat deck of a vehicle is relatively simple and economical versus the aforementioned modified vehicle structures, as will hereinafter be apparent.

One of the objects of this invention is to provide a novel construction utilizing a flat deck type vehicle having a plurality of upwardly open cylindrical bins, arranged longitudinally in a row, on and rigidly secured to the deck and each bin being dimensioned and arranged for receiving, supporting and transporting a filled flexible, collapsible container having a generally cylindrical cross section when filled with flowable material.

Another object is to provide a novel structure of the character indicated wherein each bin is interiorly dimensioned so that when a filled, flexible, collapsible container is supported therein, it will substantially occupy the entire cross-sectional area of the bin, throughout the major portion of the height of the bin.

A further object is to provide a novel structure of the character indicated wherein each of the bins tend to transmit impact loads directly to the deck of the vehicle.

Still another object is to provide a novel structure for the character indicated which is economical to manufacture and attach to a flat deck vehicle of a type which permits hauling maximum lading weight as well as effecting substantial savings in tariff rates.

It is still a further object of this invention to provide a novel structure of the character indicated which substantially precludes freezing of a filled container to the vehicle, incident to low temperatures and moisture conditions and which insures quick and easy removal of filled containers from the bins of the vehicle at all times.

Other objects and advantages of this invention will be apparent from the following description, taken in connection with the accompanying drawings.

BRIEF DESCRIPTION OF THE DRAWINGS

FIG. 1 is a fragmentary, side elevational view of a flat deck type railroad car embodying the present invention;

FIG. 2 is a fragmentary, plan view of the railroad car shown in FIG. 1;

DESCRIPTION OF THE PREFERRED EMBODIMENT

Figure 3:
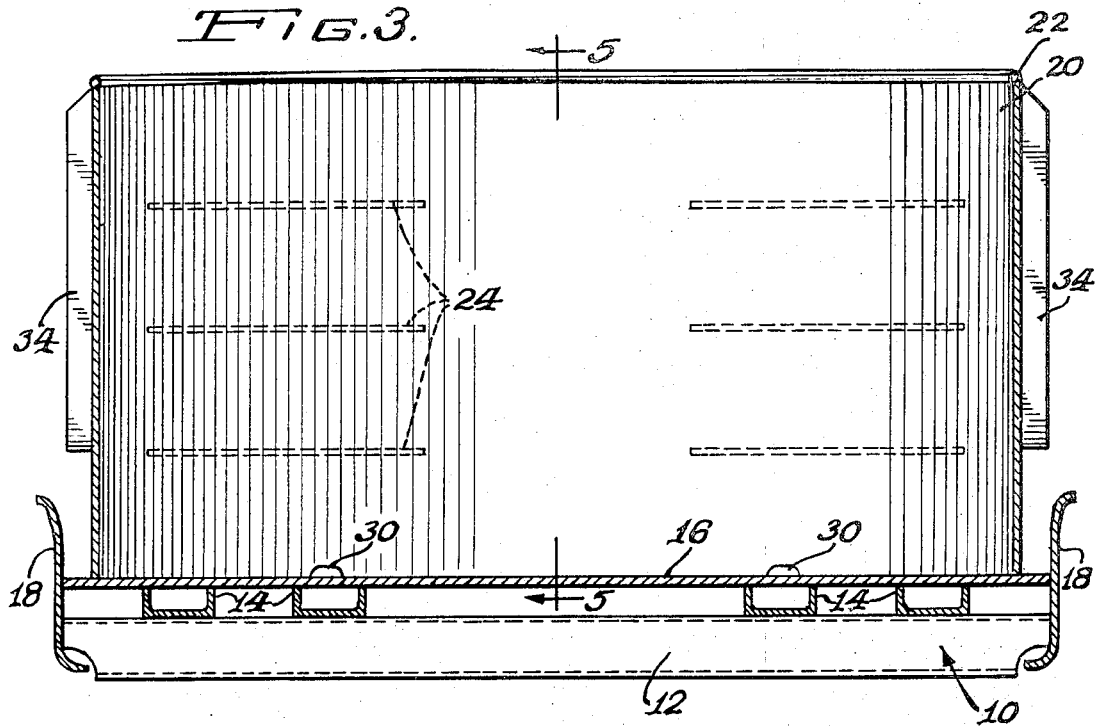
FIG. 3 is an enlarged transverse, sectional view through the car, taken substantially as indicated at lines 3—3 on FIG. 2.

The present invention is applicable to a flat deck railroad car or to a flat deck highway truck or trailer and is herein illustrated in the drawings as applied to a flat deck type railroad car. The car is provided with a main frame 10, including a plurality of structural cross members 12, welded to a plurality of longitudinally extending structural members 14 on top of which are rigidly attached, such as by welding, steel plates 16, to form a flat deck. The side edges of the frame are provided with sidesills as indicated at 18.

Figure 4:
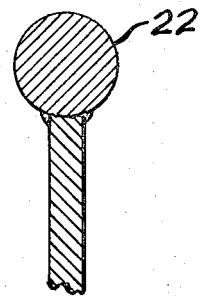
FIG. 4 is an enlarged fragmentary, sectional view through the upper end portion of a bin, taken substantially as indicated at lines 4—4 on FIG. 1.

Mounted on the steel plate deck 16 are a plurality of upwardly open bins 20, arranged in a row extending longitudinally of the car, in close spaced apart relation, as seen in FIGS. 1 and 2 of the drawings. Each of the bins is made up of sheet metal formed as a cylinder and the lower edge thereof is seated upon the steel deck 16 and welded thereto. The upper marginal edge of the sidewall of the bin has a protective edge formed of cylindrical rod 22 and welded in place substantially centrally of the thickness of the sidewall of the bin, as seen in FIG. 4 of the drawing. A series of vertically spaced apart, horizontally extending gusset plates 24, are welded to the sidewalls of each adjacent pair of bins, at opposite sides of the car. These gusset plates, as may be seen in FIG. 2, are shaped to conform to the contour of the portions of the external walls of two adjacent bins and serve to reinforce each adjacent pair of bins, and in addition serve to transmit impact loads from one bin to the next in the event the impact loads are not fully transmitted from the wall of a bin to the steel plate deck 16 and frame 10 of the car. A pair of upwardly extending, transversely spaced, reinforcing gusset plates 26, are provided at each end of the car with one vertical edge of each gusset plate welded to the outer surface of the endmost bin and the lower end thereof being welded to the steel plate of the deck 16 of the car. These vertical gussets serve to receive and transmit any residual impact load to the steel plate deck and frame of the car.

The lower marginal edge of the sidewall of each of the bins 20 are provided with a plurality of circumferentially spaced apart openings 30, through which any moisture accumulating within the bin is readily discharged. These openings serve to permit adequate drainage for any rain that may fall into the bin and any snow which thereafter is reduced to water and thus insures at all times against any appreciable amount of moisture ever remaining in a bin which might due to low temperatures, cause freezing of a container, when it is placed in the bin, to the bin and/or deck.

Welded to the exterior of the sidewall of each bin, at opposite sides of the car, are vertically extending bars 34, positioned in alignment with a plane extending through the axis of the bin, transversely of the car. These bars, which extend adjacent to the upper marginal portion of the bin, constitute index means to guide the operator of a lift truck in aligning a container, in suspended elevated position above a bin so that it may be centered and lowered into the bin, until its bottom seats upon and is supported by the deck of the car.

While, as above indicated, Sealdbin type flexible, collapsible type containers are produced in various sizes, for purposes of illustration, it may be assumed that the bins on the car are constructed and dimensioned for accommodating and transporting containers of a size capable of containing 300 cubic feet of material. These containers, depending on their intended use, are constructed so as to properly accommodate for shipping relatively heavy material having weights up to 60 pounds per cubic feet, and hence such containers for certain heavy material are capable of containing approximately 18,000 pounds of material. Such containers when filled have an average diameter of 7 feet 6 inches and have an overall height of 8 feet 3 inches. When such containers are suspended in process of moving them from place to place or in loading them or unloading them from a vehicle, the average external diameter of the container is reduced by several inches and may approximate 7 feet diameter and attain an overall height of 8 feet 11 inches. Such elongation results from the flexibility and the construction of the container. For a container of this size, it is preferred that the internal diameter of each of the cylindrical bins 20, be approximately equal to the outside diameter of a filled container when it is supported on its bottom, namely 7 feet 6 inches. Accordingly, the phrase "approximately equal to" in referring to the interior diameter of the bin with respect to the outer diameter of a filled container when supported on its bottom, as used herein and in the claims, is intended to allow for some slight variation in dimensional relationships as will hereinafter be pointed out. It is also preferable that the height of the sidewall of each bin be at least equal to one third of the height of the filled container when it is supported on its bottom in order to insure providing adequate support for the container when it is placed in a bin.

Figure 5:
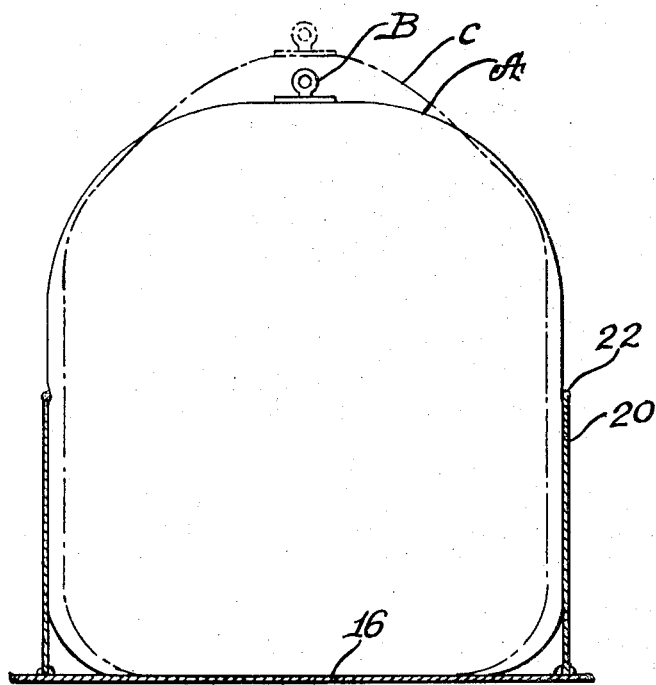
FIG. 5 is a vertical sectional view, at reduced size, through a bin with a filled, flexible, collapsible container, shown in outline, supported therein, taken at lines 5—5 on FIG. 3.

In the cross sectional view through a container, as illustrated in FIG. 5, I have shown diagrammatically in outline the contour of a filled container, indicated at A, seated in a bin 20, wherein the outer surface of the lower portion of the container substantially contacts the entire inner wall of the bin. The upper end of the top of the container, substantially centrally thereof, is provided with an eye-type fitting B, for receiving a single tine of a fork lift truck, in placing the container in and removing it from a bin. The loading port and unloading port are not shown in the diagrammatic representation in FIG. 5.

When a filled container is lifted and supported in a suspended position, preparatory to placement in a bin, the operator of the fork lift truck can then, by the assistance of the index bars 34, align the suspended container substantially centrally with respect to the bin and the suspended container may then be lowered into the bin and occupy a position as shown diagrammatically in FIG. 5. In a suspended position of the container, preparatory to becoming supported within a bin, upon the deck 16 of the car, or when it is being removed from the bin, the container assumes a contour as represented in dot-dash outline at C in FIG. 5. Because the container is reduced several inches in diameter when in suspended position, it is capable of being moved freely into and out of the bin. Once the container is deposited in the bin and totally supported upon the deck of the car, the container again expands diametrically until its outer side surface contacts the entire internal surface of the bin and thus precludes the entry of rain or snow into the bin and thus eliminates the possibility of a container ever being frozen in the bin. In the event, however, due to some irregularity of the contour of the container, moisture in the form of rain or snow does enter a bin, the liquid is readily discharged through the openings 30, at the bottom of the bin.

While it is not absolutely essential that the filled container, when it is seated in a bin, substantially contacts the entire inner surface of the bin, it is highly preferred that such a relationship exist so as to insure excluding moisture from entering the bin, either while the car is in transit or standing at a siding preparatory to being unloaded. It will also be recognized that it is not absolutely essential that the internal diameter of the bin be substantially equal to the outer diameter of a filled container in order to obtain a desired contact of the container and wall of the bin because a bin could be dimensioned so that its internal diameter is slightly less than the external diameter of the filled container, when supported on its bottom. Such a dimensional relationship would permit the container to be placed and supported in a bin and removed therefrom, due to the reduction in external diameter of the container in a suspended position.

To insure against possible damage to the container and to aid it in being seated into a bin, the protective edge 22 at the top of the bin is preferably of rounded contour and, as above indicated, is in the nature of a rod of cylindrical cross section.

By virtue of the construction above described, it will be apparent that impact loads imparted to the car and its lading are to a major degree, transmitted by each container directly to the deck and frame of the car and any excess impact loads not so transmitted are then transmitted to the next adjacent container for transmitting to the deck and frame of the car and any residual impact load that is transmitted to the end bin likewise is transmitted through the deck to the frame of the car. In addition, because of individual bins or cells for the containers, they are protected against absorbing excessive impact loads and are less likely to be damaged.

I claim:

1. A vehicle having a flat deck, and a plurality of bins of substantial size arranged in a row in spaced relation to each other and mounted on the deck, each bin being adapted to receive, support and transport an individual, flexible, collapsible container having a given cross sectional shape when containing flowable material, each bin having an upwardly open top and an upstanding sidewall formed of sheet metal and having a cross sectional shape substantially the same as said given shape, said sidewall having an internal width approximately equal to the width of the container when the container is filled with material and supported on its bottom such that the internal surface of the sidewall and the exterior walls of the container are in substantial contact with each other when the container is supported on its bottom in the bin, the internal width of said sidewall of the bin and said open top being greater than the width of the container when the latter is filled with material and disposed in a suspended position wherein said filled suspended container may be inserted into and removed from said bin through said open top, and the top of each bin being enlarged to define an edge larger than the thickness of said sidewall for protecting said container.

2. The construction of claim 1, wherein the height of the sidewall of each bin is at least equal to one third of the height of the container when it is filled with material.

3. The construction defined in claim 1, characterized by the provision of one or more drain openings formed in the lower edge portion of the sidewall of each bin.

4. The construction defined in claim 1, characterized by the provision of index means on the exterior of the sidewall of each bin in alignment with a plane extending through the axis of the bin, transversely of the vehicle.

5. The construction defined in claim 1, characterized by the provision of two index means on the exterior of the sidewall of each bin, in diametrically opposite relation and in alignment with a plane extending through the axis of the bin, transversely of the vehicle.

6. The construction defined in claim 1, characterized by the provision of a rim formed of cylindrical rod material rigidly secured to the upper edge of the sidewall of each bin and defining said enlarged top.

7. The construction defined in claim 1, characterized by the provision of gusset plates interconnecting the sidewalls of adjacent bins.

8. The construction defined in claim 1, characterized by the provision of two sets of horizontally extending gusset plates interconnecting the sidewalls of adjacent bins, at opposite sides of the longitudinal plane extending through the axes of the row of bins.

9. The construction defined in claim 1 characterized by the provision of a pair of vertically extending, transversely spaced apart, gusset reinforcing plates at each end of the vehicle, interconnecting the endmost bin to the deck of the vehicle.

10. The construction defined in claim 1, wherein said sidewall and said container when containing flowable material therein are generally cylindrical and wherein said given shape is substantially circular.

11. A vehicle having a flat deck, said deck being formed of one or more sheets of metal, and a plurality of bins of substantial size arranged in a row extending longitudinally of the deck in close, spaced apart relation, said bins each being formed to receive, support and transport an individual, flexible, collapsible container having a given cross sectional shape when containing flowable material, each bin having an upwardly open top and an upstanding sidewall formed of sheet metal with its lower marginal edge welded to the sheet metal deck, the sidewall of each bin having a cross sectional shape substantially the same as said given shape and having an internal width approximately equal to the external width of the container when the container is filled with material and supported on its bottom such that the internal surface of the sidewall and the exterior walls of the container are in substantial contact with each other when the container is supported on its bottom in the bin, the internal width of the sidewall of each bin being greater than the external width of the container when the container is filled with material and disposed in a suspended position wherein said filled suspended container may be inserted into and removed from said bin through said open top, and the top of each said bin being enlarged to define an edge larger than the thickness of said sidewall for protecting said container.

12. The construction defined in claim 11, characterized by the provision of a plurality of horizontally extending, vertically spaced apart sheet metal gusset plates welded to the exterior of the sidewalls of adjacent bins, at opposite sides of the longitudinal plane extending through the axes of the rows of bins.

13. The construction defined in claim 11, wherein said sidewall and said container when containing flowable material there are generally cylindrical and wherein said given shape is substantially circular.

* * * * *